Patented Sept. 18, 1945

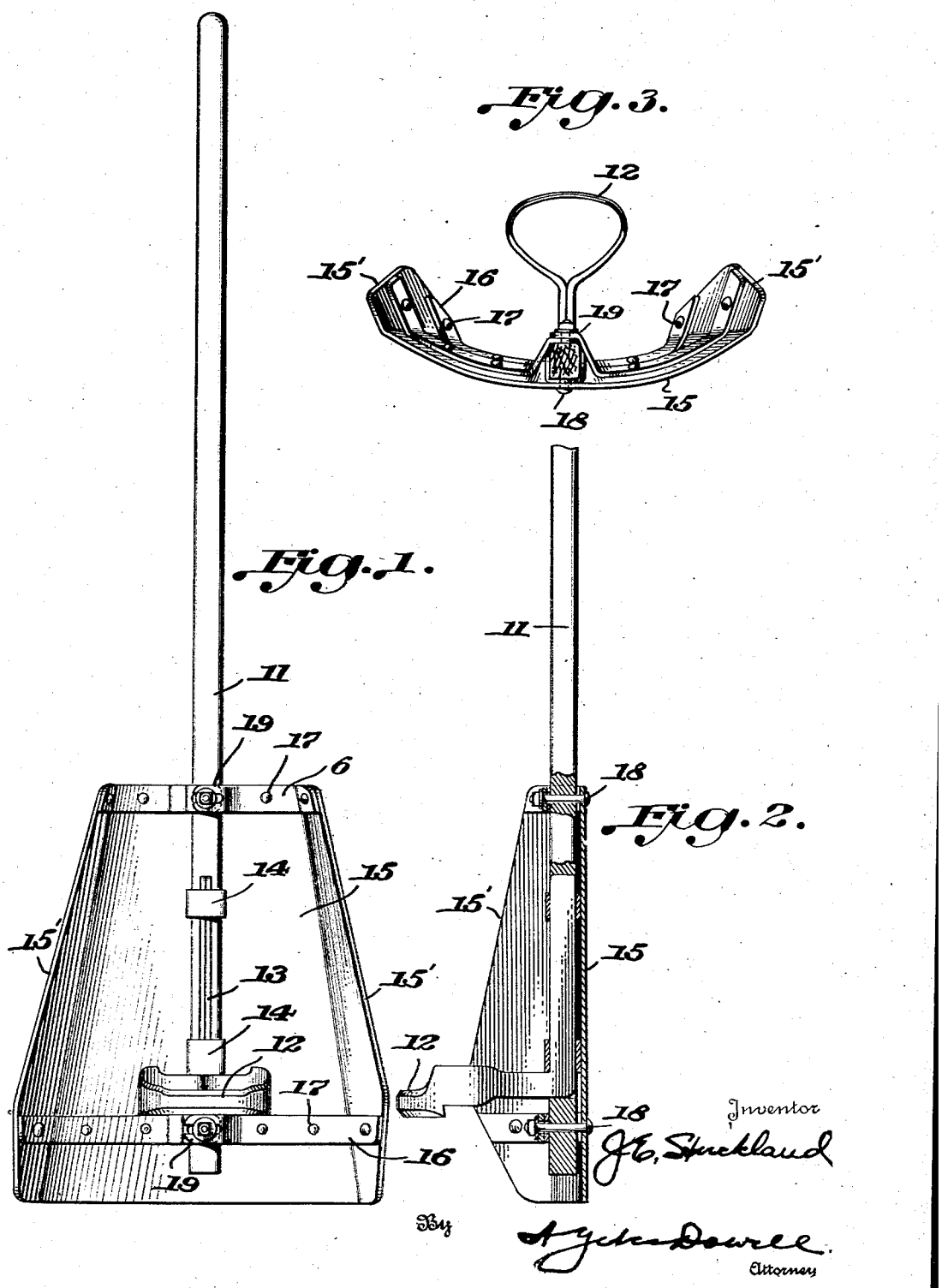

2,384,976

UNITED STATES PATENT OFFICE 2,384,976

TREE SCRAPER

John E. Strickland, Madison, Fla.

Application January 12, 1945, Serial No. 572,520

5 Claims. (Cl. 30—136)

This invention relates to the care of trees and the like, and more particularly to a tree scraper for removing loose particles, scraping off or removing scales or bark from various trees, or for removing scrape from the faces of pine trees.

As is well known, a pine tree is worked for turpentine purposes by scarifying the face of the tree above the point where a cup is hung for the purpose of collecting the resin or gum which exudes from the scarified surface, and in this process the bark of the tree where so scarified is completely removed. All of the gum which exudes from the tree does not drain into the cup, a residual of the gum becomes attached to the scarified surface, hardens and forms what is known as "scrape." When using conventional tools for removing scrape much of it is scattered and lost as it falls.

One of the objects of this invention is to provide a bark and scrape removing blade and shield so related that the particles removed will naturally fall close to the base of the tree for easy recovery, whereby likelihood of loss is reduced to a minimum.

A further object is to provide a scraper which is simple and durable in construction as well as efficient in use.

Other objects will become apparent as the nature of the invention is better understood, and the same consists in the novel form, combination and arrangement of parts hereinafter more fully described.

In the drawing wherein like reference characters indicate corresponding parts throughout the several views:

Fig. 1 is a plan view of a scraper embodying the present invention;

Fig. 2, a right side view of the construction shown in Fig. 1 taken partly in longitudinal section, and Fig. 3, an end view of the construction shown in Fig. 1.

Referring more in detail to the drawing, the present invention generally embodies a handle 11 with a blade 12 formed with a shank portion 13 fixed to the handle by straps 14, and a shield 15 having reinforcing strap members 16 fixed thereto by rivets 17 and being secured to the handle 11 by bolts 18. The bolts 18 extend through the handle 11 and through a slotted or bifurcated end portions 19 on the straps 16. The shield 15 has upturned side portions 15' and is generally shaped and positioned as shown in the drawing.

In the preferred specific construction of the invention shown, the blade 12 is "double edged," and the shield 15 extends for a considerable distance along the handle on both sides of the blade. The upturned side portions 15' converge toward the end of the handle farthest from the blade. The slotted or bifurcated end portions of straps 16 accommodate handles of different sizes.

In using the scraper of the present invention on high base trees, the handle is grasped by the user and held in such manner that it points upwardly along the base of the tree. On high base trees the scrape is preferably removed by downward strokes of the blade, whereupon the scrape, bark or other particles removed from the tree by the blade will be deflected by the smaller end of the shield so as to fall adjacent the trunk of the tree. On low base trees, the handle is grasped by the user in such a way that it points downwardly along the base of the tree, and the scraping strokes are again preferably applied in a downward direction, whereupon the particles removed will be deflected by the larger end of the shield so as to fall adjacent the trunk of the tree. Thus it will be observed that the scraper according to the present invention is useful for work on either high or low base trees, that when working on either high or low base trees the preferred stroke is made in a downward direction, but that the double edged blade of applicant's device serves for either upward or downward strokes whether the device is pointed upwardly or downwardly in working on either high or low base trees.

Moreover, attention is called to the novel construction of applicant's shield whereby when the scraper is pointed downwardly for use on low base trees, the smaller end of the shield is uppermost and serves as a partial cover for preventing removed particles from flying upwardly and outwardly and directs them downwardly so that the larger end of the shield, which is then only a few feet from the base of the tree, directs the particles into a limited area at the base of the tree. Consequently, when the scraper is pointed upwardly for use on high base trees, and work is being accomplished at a greater distance from the ground, the smaller end of applicant's shield is then closer to the ground and the shield acts much in the manner of a funnel in directing the particles downwardly toward the base of the tree. The shield should preferably be of appropriate size.

From the foregoing description it is believed that the construction and operation as well as the advantages of the present invention will be readily understood and appreciated by those skilled in the art.

It will be obvious to those skilled in the art that various changes may be made in the invention without departing from the spirit and scope thereof, and therefore the invention is not limited by that which is shown in the drawing and described in the specification but only as indicated in the appended claims.

What is claimed is:

1. A scraper having a double edged blade with a depending shank portion, a handle recessed near one end thereof with the shank of said blade embedded therein, straps surrounding said shank and said handle securely binding the two together, a shield, heavy metal strap members riveted to said shield adjacent each end thereof for reinforcing and supporting the same, said strip members having bifurcated end portions overlapping in the longitudinal center region of said shield, bolts extending through said handle on both sides of said blade and through said bifurcated end portions of said strap members affixing said shield to the handle and about said blade, said shield extending along said handle for a considerable distance on both sides of said blade and being so formed as to extend outwardly and upwardly around said blade, the sides of the blade converging toward the opposite end of the handle to which said blade is attached.

2. A scraper provided with a double edged blade having a depending shank portion, a handle having a recess adjacent one end for receiving said shank, means fastening said blade to the handle including means for binding said shank in said recess, a shield, means affixing said shield to said handle including strap members for reinforcing said shield and being provided with bifurcated end portions for accommodating handles of different sizes, said shield extending along said handle for a considerable distance on both sides of said blade and being provided with upturned side portions partially surrounding said blade and converging toward the end of said handle farthest from said blade, said shield being open at both ends.

3. A scraper having a handle, a double edged blade affixed thereto adjacent one end thereof, a shield, means for affixing said shield to said handle, said means comprising strap members reinforcing said shield and provided with bifurcated end portions for accommodating handles of different sizes, said shield having upturned side portions partially surrounding said blade and converging toward the end of said handle farthest from said blade.

4. A scraper having a handle provided with a blade adjacent one end thereof, a shield adjacent said blade and having upturned edges converging toward the other end of said handle, said shield being open at both ends.

5. A tree scraper comprising a double edged scraper blade, a handle supporting said blade transversely of the same, and a shield carried longitudinally of said handle and extending above and below said blade, said shield having side portions disposed angularly relative to its body for limiting dispersion of particles dislodged by said blade.

JOHN E. STRICKLAND.